(12) United States Patent
Tse et al.

(10) Patent No.: US 11,144,615 B1
(45) Date of Patent: Oct. 12, 2021

(54) CIRCUIT FOR PERFORMING POOLING OPERATION IN NEURAL PROCESSOR

(71) Applicant: Apple Inc., Cupertino, CA (US)

(72) Inventors: Yiu Chun Tse, Cupertino, CA (US); Ji Liang Song, Cupertino, CA (US); Ponan Kuo, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 31 days.

(21) Appl. No.: 16/848,378

(22) Filed: Apr. 14, 2020

(51) Int. Cl.
*G06F 17/16* (2006.01)
*G06F 7/523* (2006.01)

(52) U.S. Cl.
CPC .............. *G06F 17/16* (2013.01); *G06F 7/523* (2013.01)

(58) Field of Classification Search
CPC ................................. G06F 17/16; G06F 7/523
USPC ........................................................ 708/520
See application file for complete search history.

(56) References Cited

U.S. PATENT DOCUMENTS

| | | |
|---|---|---|
| 2019/0065938 A1 | 2/2019 | Liu et al. |
| 2019/0205738 A1 | 7/2019 | Bannon et al. |
| 2019/0266485 A1 | 8/2019 | Singh et al. |
| 2020/0160226 A1* | 5/2020 | Ross ..................... G06F 17/153 |
| 2020/0265108 A1* | 8/2020 | Dong ..................... H03M 7/30 |
| 2021/0182025 A1* | 6/2021 | Shafiee Ardestani ..... G06T 1/20 |

\* cited by examiner

*Primary Examiner* — Tan V Mai
(74) *Attorney, Agent, or Firm* — Fenwick & West LLP

(57) ABSTRACT

Embodiments relate to a denominator circuit that determines the number of valid elements of a data surface covered by a kernel depending on various locations of the kernel relative to the data surface. The denominator circuit includes a first circuit and a second circuit that have the same structure. The first circuit receives numbers representing different horizontal locations of a reference point in the kernel and generates a first matrix with first output elements corresponding to the different horizontal locations. The second circuit receives numbers representing different vertical locations of a reference point in the kernel and generates a second matrix with second output elements corresponding to the different vertical locations. A matrix multiplication of the first matrix and the second matrix is performed to obtain an array of valid elements covered by the kernel.

20 Claims, 13 Drawing Sheets

CIRCUIT FOR PERFORMING POOLING OPERATION IN NEURAL PROCESSOR

BACKGROUND

1. Field of the Disclosure

The present disclosure relates to a circuit for performing pooling operation in a neural processor, more specifically to a circuit for determining a number of valid elements in a pooling operation.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

ANN often involves pooling operations where the number of data is spatially reduced. Some of the pooling operations (e.g., average pooling) may use the number of valid elements in the data being processed to accurately calculate pooled values.

SUMMARY

Embodiments relate to determining denominator numbers representing the numbers of valid elements of a data surface covered by a kernel. A first series of numbers representing the numbers of valid elements in a row of the data surface covered by a row of the kernel when a first reference point of the row of the kernel is placed at different column locations of the row of the surface is determined. A second series of numbers representing the numbers of valid elements in a column of the data surface covered by a column of the kernel when a second reference point of the column of the kernel is placed at different locations of the column of the surface is determined. Then, the first series of numbers with the second series of numbers are matrix multiplied to obtain the denominator numbers.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a denominator circuit that determines the numbers of valid elements of a data surface covered by a kernel depending on various locations of the kernel relative to the data surface. The denominator circuit includes a first circuit and a second circuit of the same structure. The first circuit receives numbers representing different horizontal locations of a reference point in the kernel and generates first numbers corresponding to the different horizontal locations of the kernel. The second circuit receives numbers representing different vertical locations of a reference point in the kernel and generates second numbers corresponding to the different vertical locations. A matrix multiplication of the first numbers and the second numbers is performed to obtain an array of valid elements in the data surface covered by the kernel.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
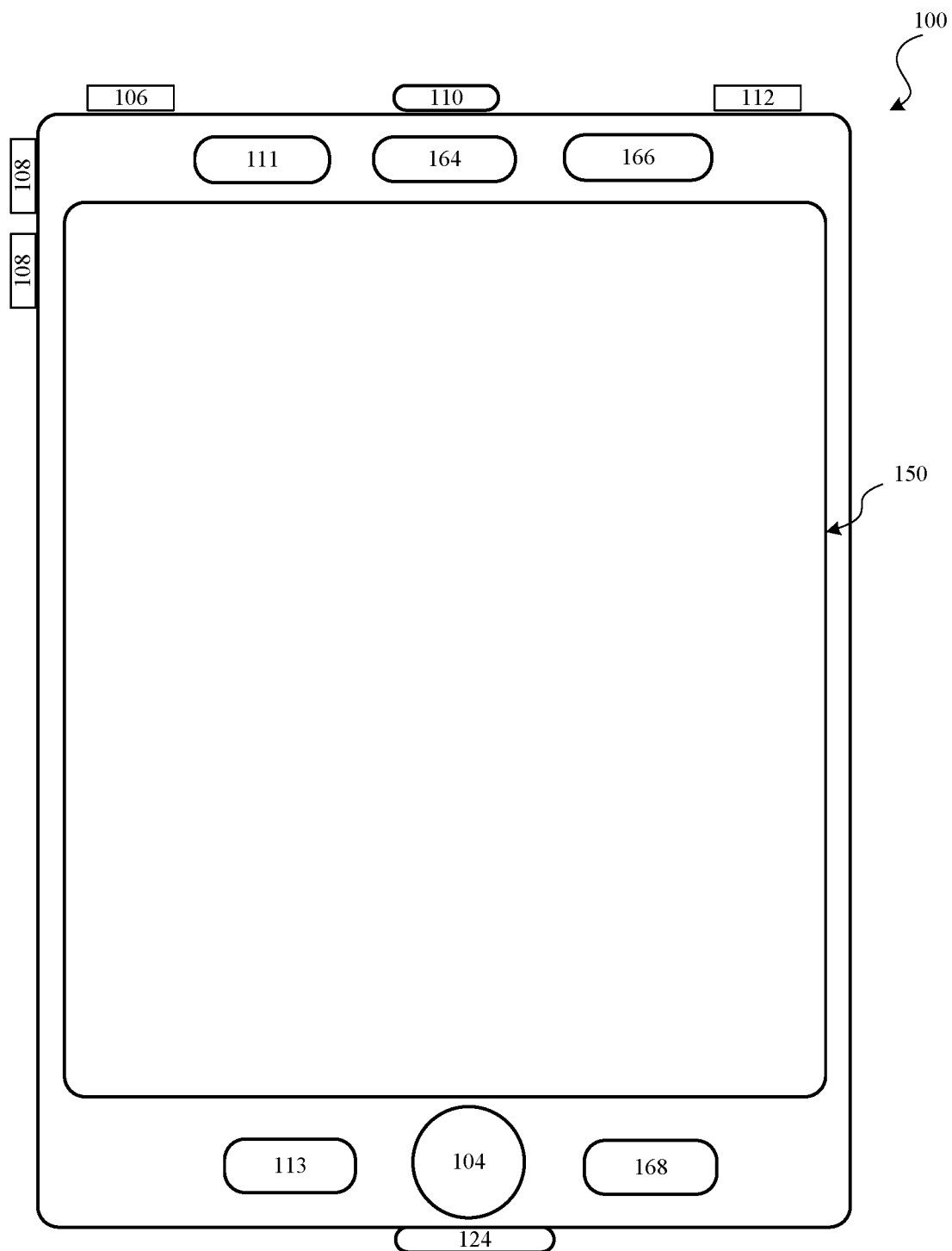
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
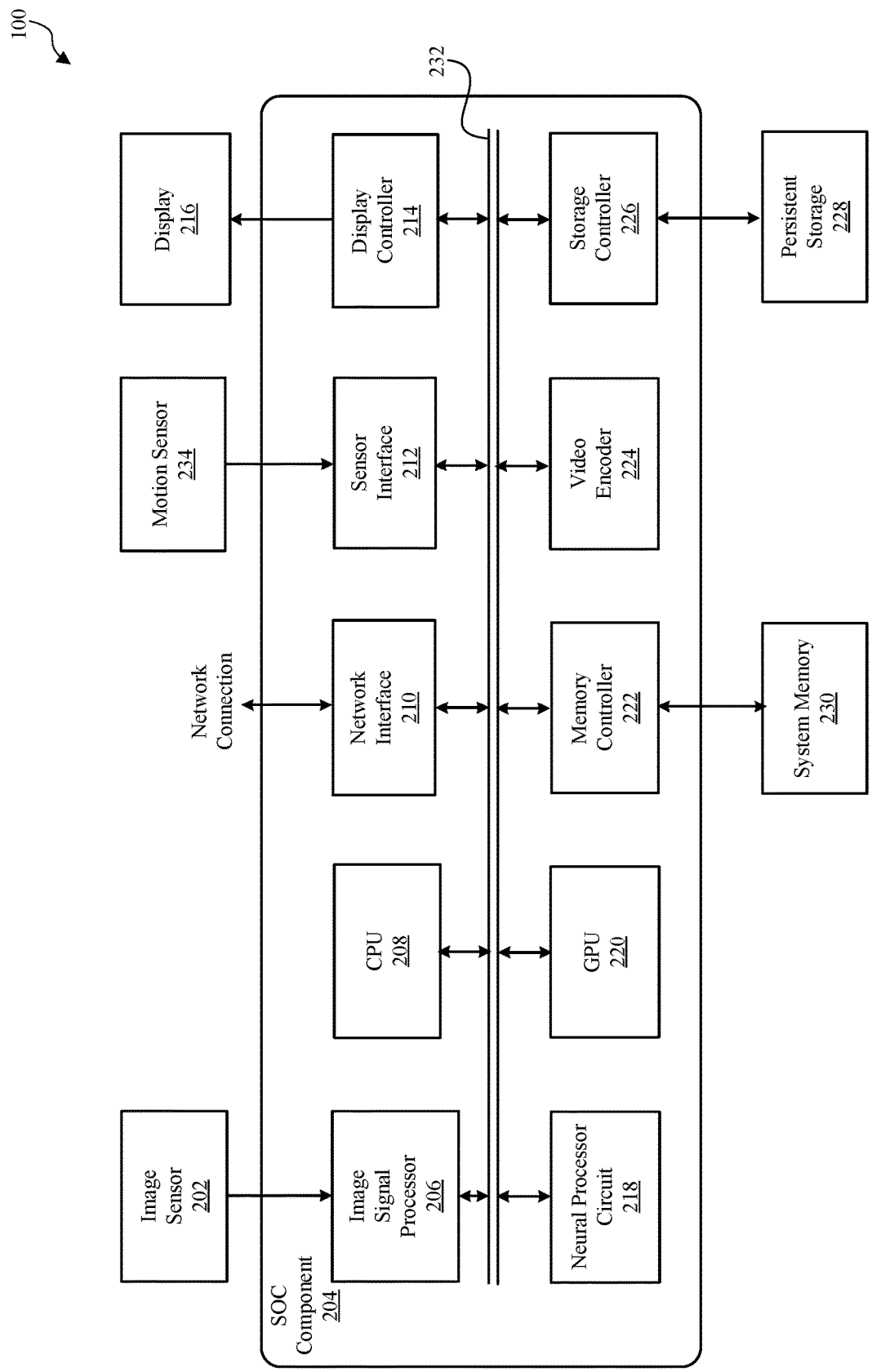
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tan h), and rectified linear unit functions (ReLU). After a batch of data of training samples passes through a neural network in the forward propagation, the results may be compared to the training labels of the training samples to compute the network's loss function, which represents the performance of the network. In turn, the neural network performs back-propagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
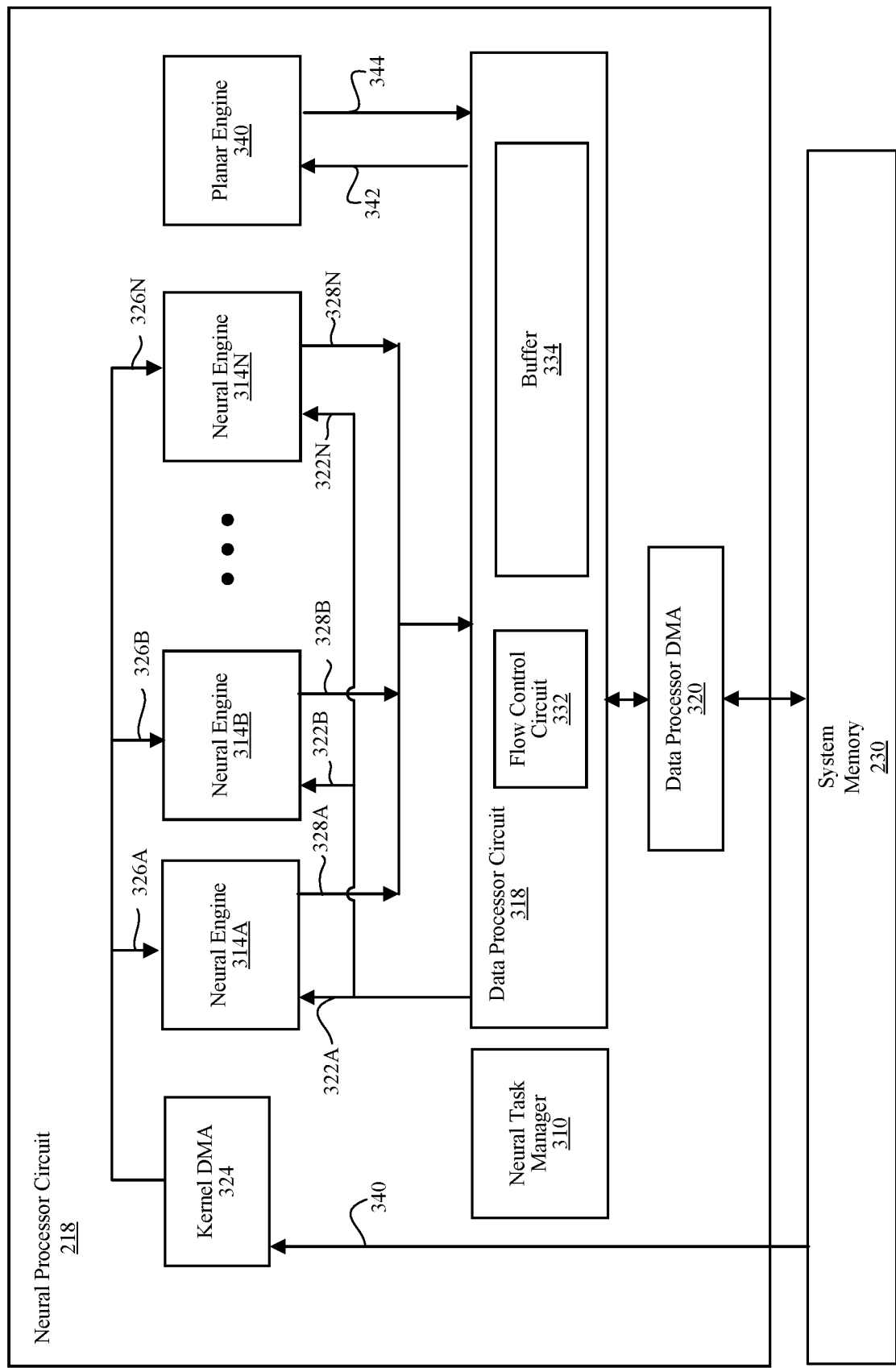
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode. In the pooling mode, planar engine 340 reduce a spatial size of input data. The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer 334. Buffer 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Example Neural Engine Architecture

Figure 4:
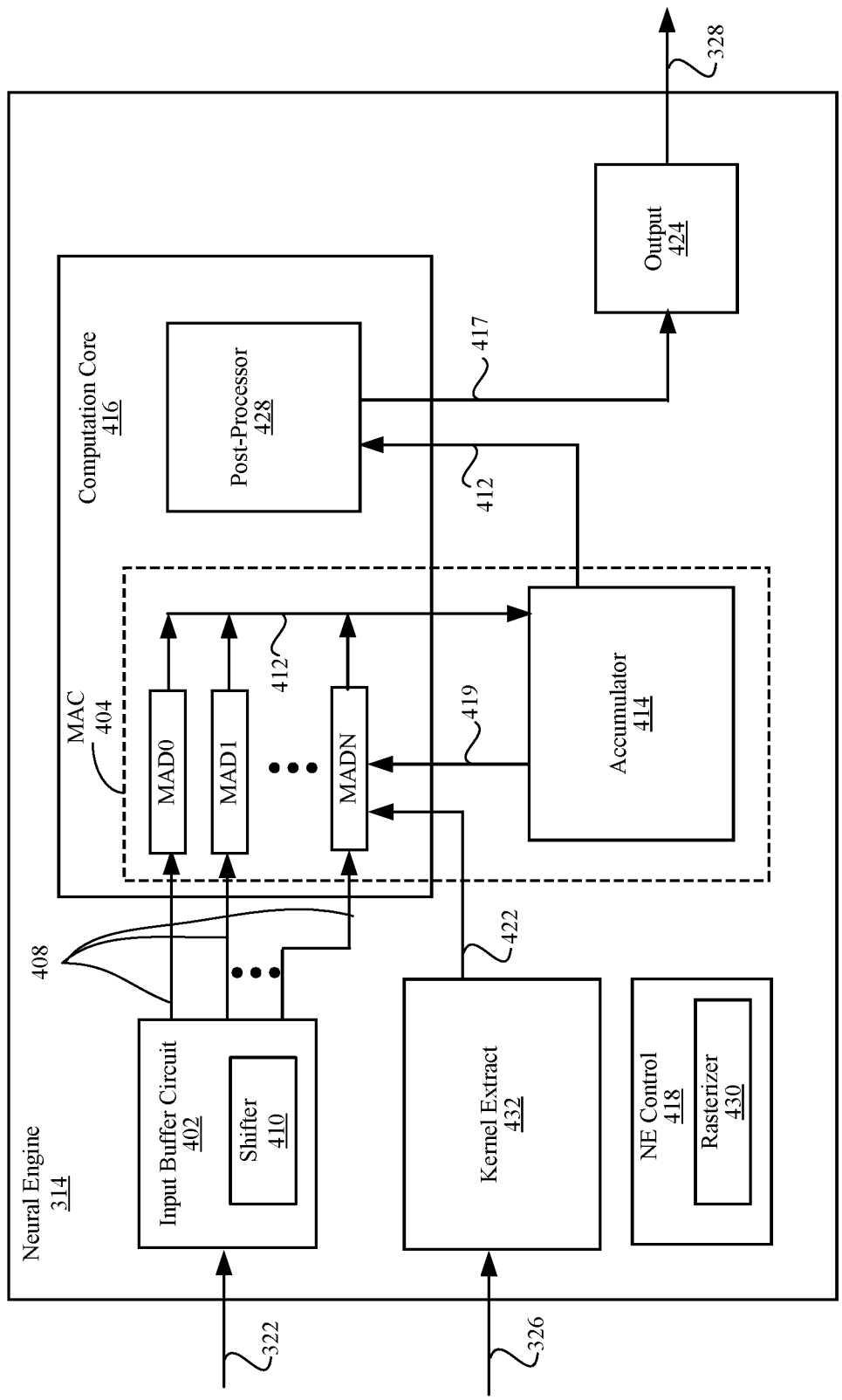
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 414 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels or the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, buffer DMA 320, data buffer 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
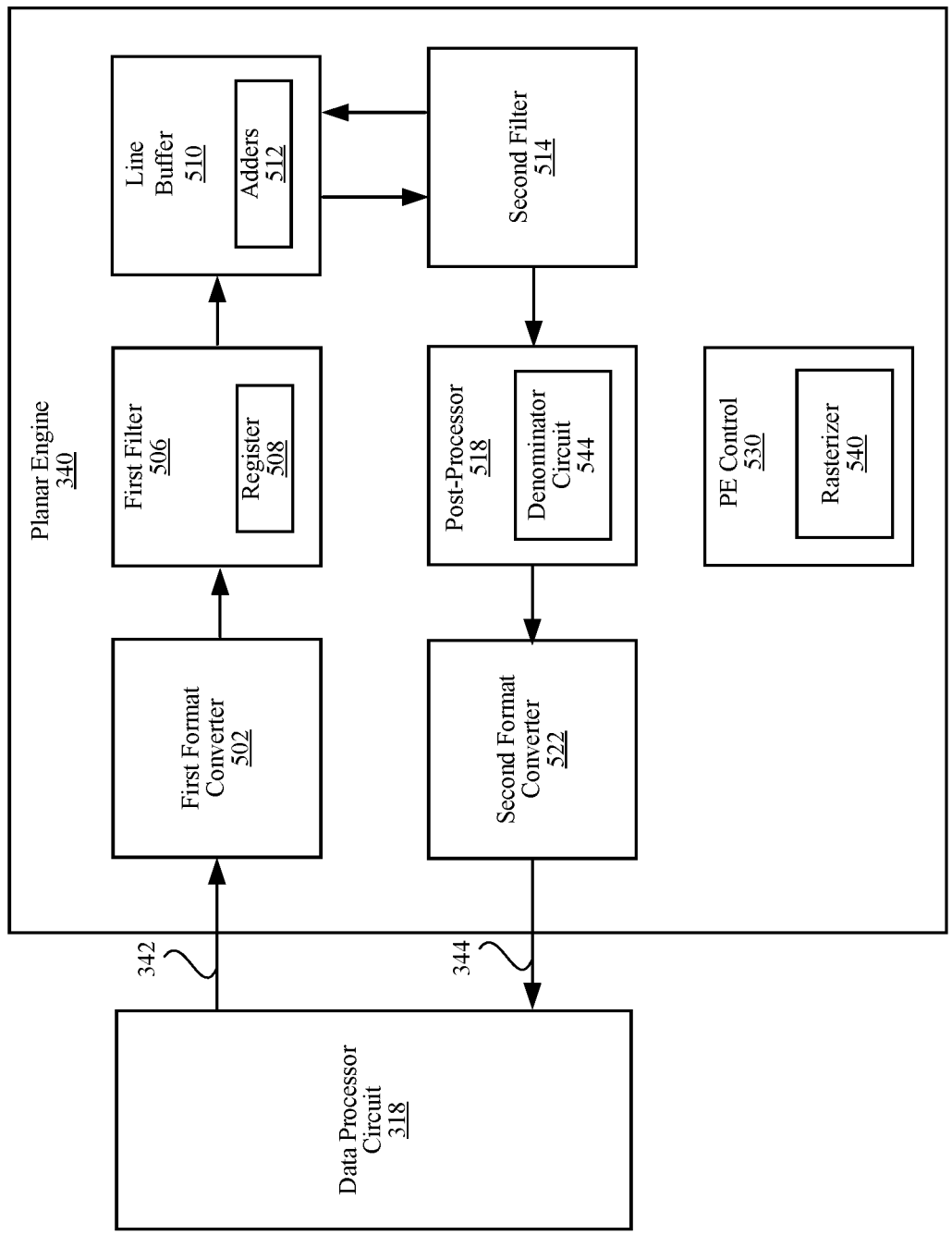
FIG. 5 is a block diagram of a planar engine in the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of datas. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. In a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In some modes, first filter 506 may include register 508 used to accumulate values generated in different operating cycles.

Post-processor 518 is a circuit that performs further processing of values fetched from other upstream components. Post-processor 518 may include specialized circuits that are efficient at performing certain types of mathematical computations that might be inefficient to perform using a general computation circuit. Post-processor 518 may be bypassed in other operation modes. Post-processor 518 includes, among other specialized circuits, denominator circuit 544 that determines an array of numbers representing the number of valid elements in a surface of data received from second filter 514.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Figure 6A:
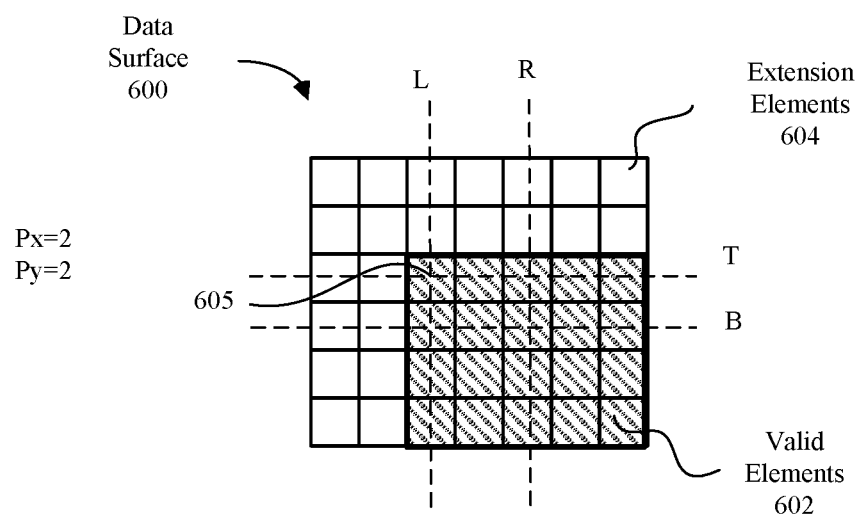
FIGS. 6A through 6F are conceptual diagrams illustrating determining of the numbers of valid elements covered by a kernel of a smaller spatial size than the size of valid elements, according to one embodiment.
Figure 6B:
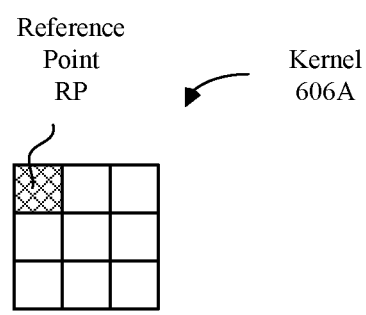
Figures 6C, 6D:
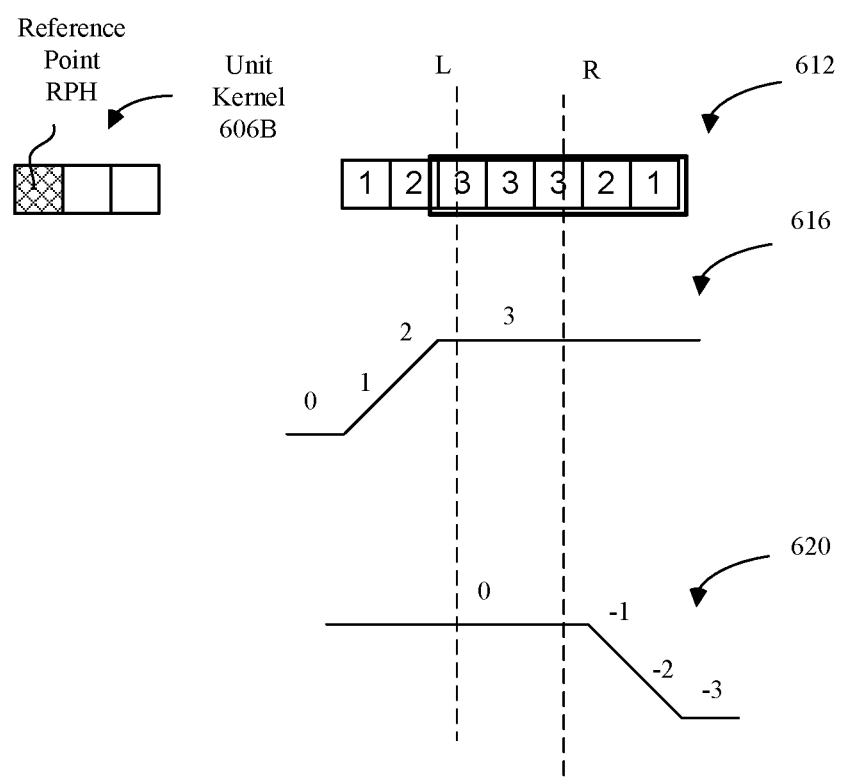

FIGS. 6A, 6B, and 6C are the conceptual diagrams illustrating operations for different example modes of planar engine 340, according to an embodiment. The 5×5 input data 342 of two dimensions (e.g., a rank 2 tensor) is shown only for illustration purpose. The input data 342 can be of any suitable size and ranks. Input data 342 may be the data saved in buffer 334 of the data processor circuit 318. For example, in some cases, the data saved in buffer 334 fetched as input data 342 is an output of neural engine 314. In other cases, the data saved in buffer 334 fetched as input data 342 may be the output of planar engine 340 in previous cycles. In yet other cases, the data saved in buffer 334 fetched as may be a segment of data received from system memory 230.

Example Mechanism for Determining Number of Valid Elements

One of the operations planar engine 340 may perform is pooling. To perform accurate average pooling, for example, elements in a patch of data surface corresponding to the dimension of a kernel are added and their sum is divided by a denominator. The denominator may be the number of valid elements that are covered by a kernel, and may exclude the number of extension elements of the data surface covered by the kernel for an accurate pooling operation. By obtaining the number of valid elements, the average pooling operation may result in a more accurate result. Denominator circuit 544 in planar engine 340 determines the number of valid elements in the data surface depending the location of the patch of data surface to be processed with the kernel. Such valid elements to be processed by the kernel at a time is hereinafter referred to as valid elements "covered" by the kernel.

For purpose of illustration and explanation, two-dimensional data surfaces with valid elements and extension elements are described hereinafter. Further, the data surfaces are described with reference to horizontal and vertical directions for the sake of explanation. However, data surfaces of three or more dimensions can also be processed using the principles described herein.

FIG. 6A is a diagram illustrating data surface 600 including 5×4 array of valid elements 602 surrounded by extension elements 604, according to one embodiment. Valid elements 602 represent meaningful data elements that represent, for example, pixels captured by an image sensor. Extension elements 604 are extended elements added to the valid elements 602 for various processing using kernels, such as convolution operations and pooling operations. These extension elements 604 are often padded with numbers such as zero. In the example of FIG. 6A, the valid elements 602 are extended with two extension elements in the horizontal direction (Px=2) and two extension elements in the vertical direction (Py=2). In other words, data surface 600 has two padding columns (Px=2) and two padding rows (Py=2).

In one or more embodiments, a junction between one horizontal border and one vertical corner is set as an origin of a coordinate system for the elements in the data surface. Elements to one side (e.g., right side or lower side) of the vertical border or the horizontal border has a positive horizontal or vertical coordinate value whereas elements to the other side (e.g., left side or upper side) of the vertical border or the horizontal border has a negative horizontal or vertical coordinate value. In this way, the number of comparators or adders in denominator circuit 544 can be reduced as described below with reference to FIG. 8. In the example of FIG. 6A, junction point 605 of left vertical border L and top horizontal border T is set as the origin of the coordinate system. Hence, the left top end of the valid elements 602 has a coordinate value of (0, 0) while an extension element to the left of valid element 602 and another extension element above valid element 602 has (x, y) coordinates of (−1, 0) and (0, −1), respectively.

Under such a coordinate system, the other vertical border R can be set as the difference between the width of the data surface Sw and the width of the kernel Kw (R=Sw−Kw). In the example of FIG. 6B, R vertical border is 2.

FIG. 6B is a diagram illustrating kernel 606A to be applied to data surface 600, according to one embodiment. Kernel 606A is of 3×3 size and has a size smaller than the size of data surface 600. The upper-left corner of kernel 606A is referred to as a reference point RP, which is used as a point of reference to explain the elements of the data surface 600 covered by kernel 606A. Locating the reference point RP at upper-left corner is merely an example, and other locations of a kernel may also be used.

Referring back to FIG. 6A, all of the kernel elements cover valid elements 602 when reference point RP of kernel 606A is placed on one of data surface elements surrounded by vertical borders L, R and horizontal borders T, B. When reference point RP is placed on other data surface elements beyond these borders, only a subset of kernel elements covers valid elements 602.

To perform a single pooling average operation using kernel 606A, elements of data surface 600 of the same size are selected. Depending on the location of the reference point RP on data surface 600, the number of valid elements covered by kernel 606A (also referred to herein as "denominator") may change as illustrated in FIG. 6C. For example, if RP of kernel 606A is placed at top, left corner of data surface 600, only the bottom right kernel element covers one of the valid elements 602 (shown as "1" in the top-left corner of matrix in FIG. 6C) while the remaining kernel elements cover extension elements. As RP moves to the right side or a lower side, the number of valid elements covered by kernel 606A is changed horizontally or vertically as shown in FIG. 6C. Denominator circuit 544 is a hardware that determines the numbers of valid elements covered by the kernel (for example, as shown in FIG. 6C) to enable more accurate performance of pooling operations.

To obtain the number of valid elements of FIG. 6C, two separate processes may be performed in sequence or in parallel: One process relates to determining a first series of numbers representing the coverage of a kernel in a horizontal direction when the kernel is placed at different horizontal locations (referred to as "column locations" or x coordinates herein), and the other process relates to determining a second series of numbers representing the coverage of the kernel in a vertical direction when the kernel is placed at different vertical locations (e.g., referred to as "row locations" or y coordinates herein). By matrix multiplying the two series of numbers, the valid elements covered by the kernel at different column and row locations can be obtained.

In the example of FIG. 6D, row kernel 606B (corresponding, for example, to the top row of kernel 606A) and a row 612 of data surface 600 are used to explain obtaining of the first series of numbers. As reference point RPH of row kernel 606B is placed at various locations, the number of valid elements covered by row kernel 606B is determined as shown in the boxes of row 612 is determined using first circuit 820, as described below with reference to FIG. 8.

Specifically, a series of numbers 616 (1, 2, 3, 3, 3, 3, 3) represents the smaller of (i) the width of row kernel 606B and (ii) sums of horizontal locations (e.g., column locations) of reference point RPH and the width of the kernel. Since horizontal locations of elements at the left side of vertical border L have negative values, numbers 616 at left side of vertical border L is (ii) sums of horizontal locations of RPH and the width of kernel. On the other hand, horizontal locations of elements to the right side of vertical border L have positive values, and hence, numbers 616 to the right side of vertical border is (i) the width of the kernel, which is 3. A series of numbers 620 (0, 0, 0, 0, −1, −2, −3) represents the smaller of (i) a fixed number (e.g., zero) and (ii) differences between the horizontal locations (e.g., column locations) of reference point RPH and the horizontal location of vertical border R. As set forth above, vertical border R is a difference between a width of the data surface and the width of the kernel. By adding up the series of numbers 616 and corresponding numbers 620, a series of first numbers corresponding to the numbers in row 612 (1, 2, 3, 3, 3, 2, 1) is obtained. Embodiments described herein uses a circuit (e.g., circuit 820) to determine the first series of numbers (in row 612), as described below in detail with reference to FIG. 8.

Figure 6E:
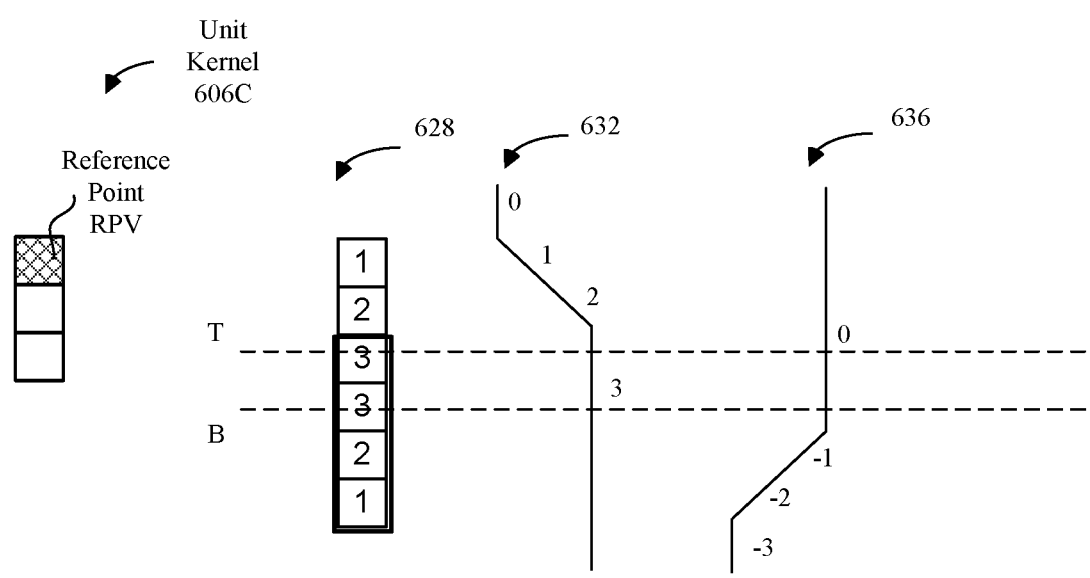

Separately and in parallel, column kernel 606C (e.g., left column of kernel 606A) and a column 628 of data surface 600 are used, as illustrated in FIG. 6E, to obtain the second series of numbers. As reference point RPV of column kernel 606C is placed at various horizontal locations, the numbers of valid elements covered by column kernel 606C (as shown in the boxes of column 628) are determined using second circuit 830, as described below with reference to FIG. 8.

Specifically, a series of numbers 632 (1, 2, 3, 3, 3, 3) represents the smaller of (i) the height of column kernel 606C and (ii) sums of vertical locations (e.g., row locations) of reference point RPV and the height of the kernel. Since vertical locations of elements above horizontal border T have negative values, numbers 632 above of horizontal border T is (ii) sums of horizontal locations of RPH and the width of kernel. On the other hand, vertical locations of elements to below horizontal border T have positive values, and hence, numbers 632 below horizontal border T is (i) the height of the kernel, which is 3. A series of numbers 636 (0, 0, 0, −1, −2, −3) represents the smaller of (i) a fixed number (e.g., zero) and (ii) differences between the vertical locations (e.g., row locations) of reference point RPV and the vertical location of horizontal border B. Horizontal border B is a difference between the height of the data surface and the height of the kernel. By adding up the series of numbers 632 and corresponding numbers 636, the numbers in row 612 (1, 2, 3, 3, 2, 1) that correspond to the second series of numbers are obtained.

Figure 6F:
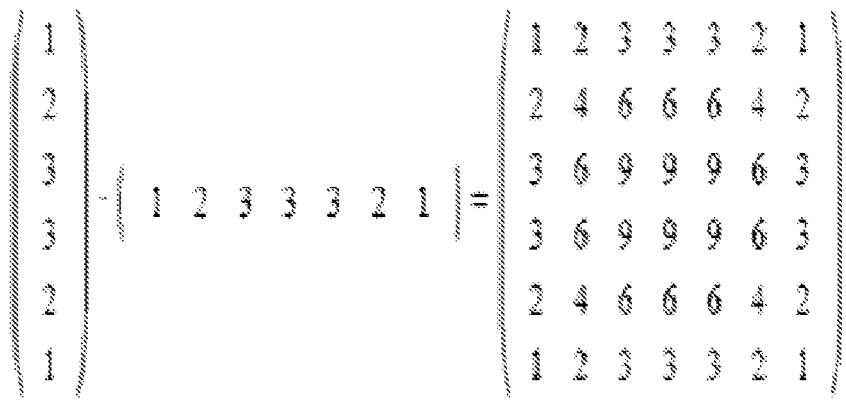

The first series of numbers (shown in row 612) and the second series of numbers (shown in column 628) are matrix multiplied as shown in FIG. 6F to obtain the numbers of valid elements covered by kernel 606A or denominator numbers. Such matrix multiplication is performed by matrix multiplier 810 in FIG. 8.

Figure 7A:
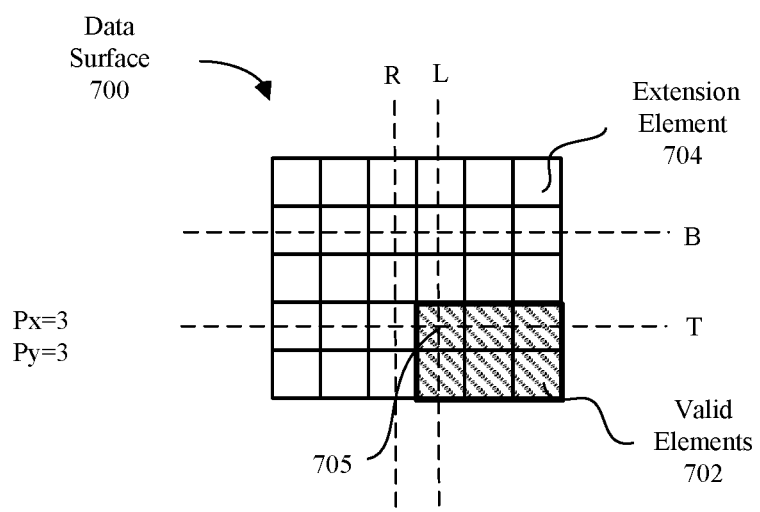
FIGS. 7A through 7F are conceptual diagrams illustrating of determining the numbers of valid elements covered by a kernel of a larger spatial size than the size of valid elements, according to one embodiment.
Figure 7B:
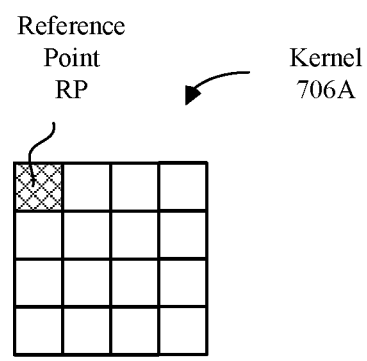

Similar methods may be used for various different scenarios to determine the numbers of valid elements covered by a kernel. FIGS. 7A and 7B illustrate a scenario where the spatial size (3×2) of valid elements is smaller than the size of kernel (4×4), according to one embodiment. As shown in FIG. 7A, data surface 700 includes 3×2 array of valid elements 702 surrounded by extension elements 704, according to one embodiment. In the example of FIG. 7A, the valid elements 702 are extended with three extension elements in the horizontal direction (Px=3) and three extension elements in the vertical direction (Py=3). The two vertical borders L and R are adjacent to each other, and therefore, there is no elements surrounded by the two vertical borders. This implies that there is no location of kernel 706A at which all kernel elements cover valid elements 702. The origin of coordinate in this example is junction 705 of horizontal border B and vertical border L. That is, the left top valid element has a coordinate of (0, 0).

FIG. 7B is a diagram illustrating kernel 706A to be applied to data surface 700, according to one embodiment. Kernel 706A is of 4×4 size and has a size larger than the size of valid elements 702 but smaller than data surface 700. The upper-left corner of kernel 706A is referred to as a reference point RP, which is used as a point of reference to explain the elements of the data surface 700 covered by kernel 706A.

Figures 7C, 7D:
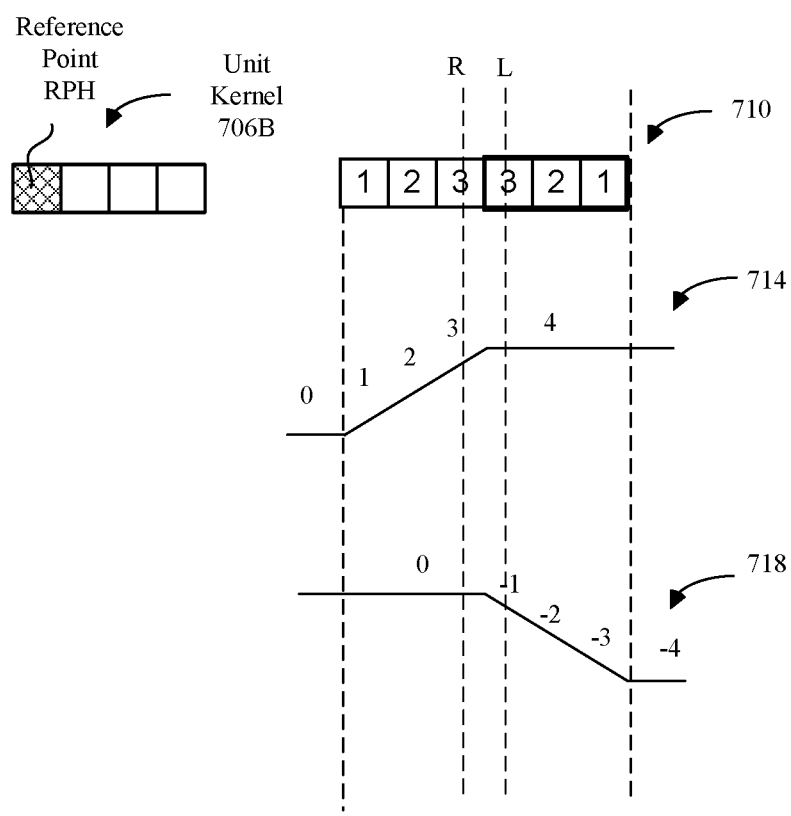

Depending on the location of the reference point RP on data surface 700, the number of valid elements covered by kernel 706A is illustrated in FIG. 7C. To obtain the numbers of valid elements in FIG. 7C, two separate processes may be performed in sequence or in parallel: One is using row kernel 706B over a row of data surface 700 and the other is using column kernel 706C over a column of data surface 700.

FIG. 7D illustrates the first process of using row kernel 706B (e.g., top row of kernel 706A) and row 710 of data surface 700, according to one embodiment. As reference point RPH of row kernel 706B is placed at various locations on row 710, the number of valid elements covered by row kernel 706B (as shown in the boxes of row 710) is determined using first circuit 820, as described below with reference to FIG. 8.

Specifically, a series of numbers 714 (1, 2, 3, 4, 4, 4) represents the smaller of (i) the width of row kernel 706B and (ii) sums of horizontal locations (e.g., column locations) of reference point RPH and the width of the kernel. Horizontal locations of elements at the left side of vertical border L have negative values, and therefore, numbers 714 at left side of vertical border L is (ii) sums of horizontal locations of RPH and the width of kernel. On the other hand, horizontal locations of elements to the right side of vertical L have positive values, and hence, numbers 714 to the right side of vertical border is (i) the width of the kernel, which is 4. A series of numbers 718 (0, 0, 0, −1, −2, −3) represents the smaller of (i) a fixed number (e.g., zero) and (ii) differences between the horizontal locations (e.g., column locations) of reference point RPH and the horizontal location of vertical border L. The location of vertical border R is placed at a coordinate corresponding to a difference between a width of the data surface and the width of the kernel. By adding up the series of numbers 714 and corresponding numbers 718, a series of first numbers corresponding to the numbers in row 710 (1, 2, 3, 3, 2, 1) are obtained.

Figure 7E:
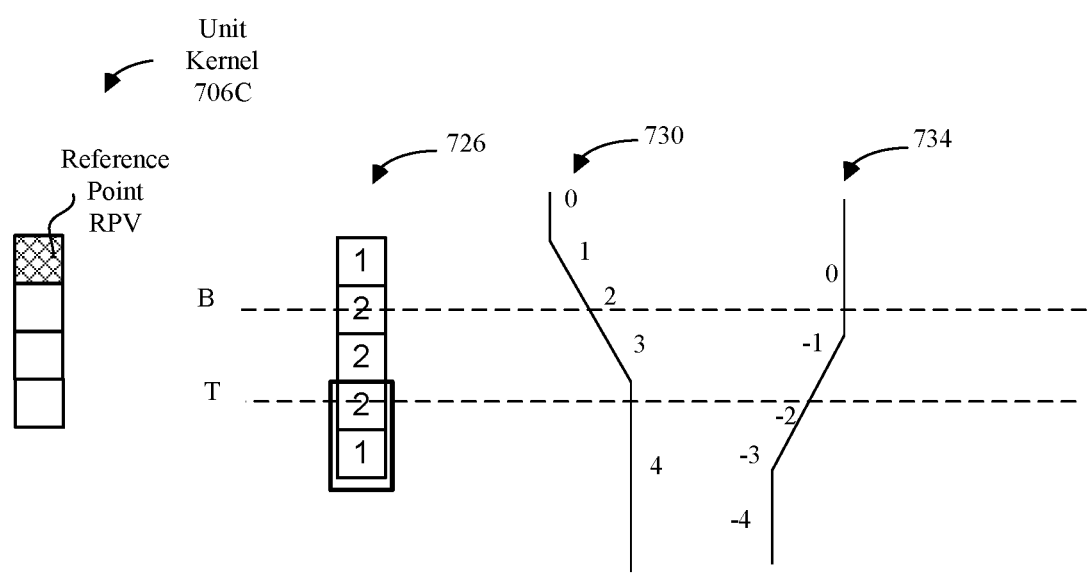

Separately or in parallel, column kernel 706C (left column) of kernel 706A and a column 726 of data surface 700 are used, as illustrated in FIG. 7E, to obtain the second series of numbers. As reference point RPV of column kernel 706C is placed at various vertical locations, the number of valid elements covered by column kernel 706C (as shown in the boxes of column 726) is determined using second circuit 830, as described below with reference to FIG. 8.

Specifically, a series of numbers 730 (1, 2, 3, 4, 4) represents the smaller of (i) the height of column kernel 706C and (ii) sums of vertical locations (e.g., row locations) of reference point RPV and the height of the kernel. Vertical locations of elements above horizontal border B have negative values, and therefore, numbers 730 above horizontal border B is (ii) sums of horizontal locations of RPH and the width of kernel. On the other hand, vertical locations of elements below horizontal border B have positive values, and hence, numbers 730 below horizontal border B is (i) the height of the kernel, which is 4. A series of numbers 734 (0, 0, −1, −2, −3) represents the smaller of (i) a fixed number (e.g., zero) and (ii) differences between the vertical locations (e.g., row locations) of reference point RPV and the vertical location of horizontal border T. Horizontal border T is a difference between the height of the data surface and the height of the kernel. By adding up the series of numbers 730 and corresponding numbers 734, the numbers in column 726 (1, 2, 2, 2, 1) that corresponds to the second series of numbers are obtained.

Figure 7F:
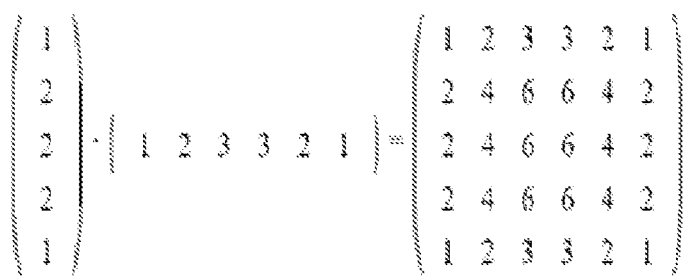

The first series of numbers (shown in the row 710) and the second series of numbers (shown in column 726) are matrix multiplied as shown in FIG. 7F to obtain the numbers of valid elements covered by kernel 706A. Such matrix multiplication is performed by a matrix multiplier 810 in FIG. 8.

Example Circuit for Determining Number of Valid Elements

Figure 8:
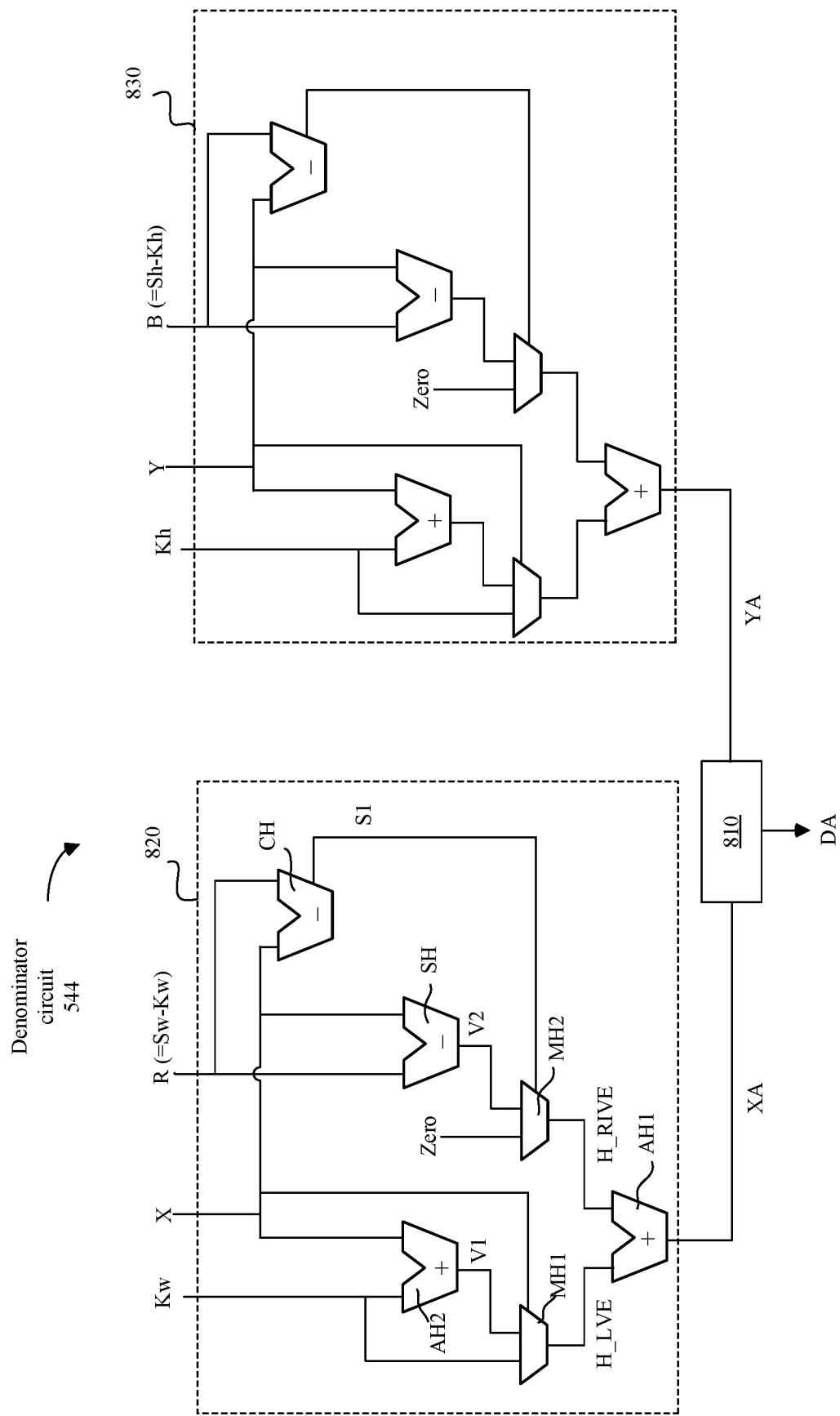
FIG. 8 is a block diagram illustrating a denominator circuit for determining the numbers of valid elements covered by a kernel, according to one embodiment.

FIG. 8 is a block diagram illustrating denominator circuit 544, according to one embodiment. The denominator circuit 544 may include, among other components, first circuit 820, second circuit 830 and matrix multiplier 810. That is, first circuit 820 and second circuit 830 include the same circuit components arranged in the same manner.

First circuit 820 is a circuit that generates the first series of numbers XA representing valid elements covered by a row kernel as horizontal location X of reference point RPH of the row kernel changes. For this purpose, first circuit 820 receives the width of kernel Kw, column locations X of reference point RPH of the row kernel, and difference R (corresponding to difference between the width of the data surface Sw and the width of the kernel Kw). Such values may be available for programmable register in neural processor circuit 218. First circuit 820 may include, among other components, first adder circuit AH1, second adder circuit AH2, first multiplexer MH1, second multiplexer MH2, comparator CH, and subtractor SH.

First multiplexer MH1 generates first outputs H_LVE each representing smaller numbers of (i) a width of the kernel and (ii) first sums V1 of the different column locations X of reference point RPH and the width of the kernel Kw. Second multiplexer MH2 generates second outputs H_RIVE each representing the smaller of (i) a fixed value of zero and (ii) differences V2 between different column locations X of reference point RPH and a difference R between a width of the data surface Sw and the width of the kernel Kw. Specifically, first multiplexer MH1 includes two inputs and selects numbers from one of the inputs as its output. One of the inputs receive the width of the kernel Kw while the other of the inputs receives the first sums V1. An output of first multiplexer MH1 outputs, as first outputs H_LVE, the width of the kernel Kw when column location X of reference point RPH is positive. If column location X of reference point RPH is negative, a first sum V1 is output as first outputs H_LVE.

First adder circuit AH1 is coupled to first multiplexer MH1 to receive first outputs H_LVE, and second multiplexer MH2 to receive second outputs H_RIVE. First adder circuit AH1 generates first series of numbers XA by adding first outputs H_LVE and second series of numbers H_RIVE. In other embodiments, first series of numbers XA may be obtained by subtracting second outputs H_RIVE from the first outputs H_LVE.

Second multiplexer MH2 also has two inputs and selects one of the inputs as its output depending on signal S1 received from comparator circuit CH. Specifically, one of its inputs receives the fixed number of zero and the other of its inputs receive differences V2. Differences V2 represent the differences between difference R (corresponds to difference between the width of the data surface and the width of kernel) and column location X. Second multiplexer MH2 outputs, as second outputs H_RIVE, the fixed number when signal S1 indicates that column location X is smaller than difference R. Conversely, second multiplexer MH2 outputs, as second outputs H_RIVE, differences V2 when signal S1 indicates that column location X is larger than difference R between width of data surface Sw and the width of kernel Kw.

Comparator circuit CH is a circuit that receives column location X of reference point RPH and difference R. Comparator circuit CH compares column location X of reference point RPH and difference R, and generates signal S1 that indicates which one of column location X of reference point RPH and difference R is larger.

Second adder circuit AH2 is a circuit that generates first sums V1 by adding the width of kernel Kw and column location X of reference point RPH. For this purpose, second adder circuit AH2 includes a first input to receive the width of the kernel Kw, a second input to receive different column locations X, and an output coupled to first multiplexer MH1.

Subtractor SH is a circuit that outputs difference V2 that is the difference between difference R and column location X of reference point RPH. For this purpose, subtractor SH includes a first input to receive difference R, a second input to receive column location X of reference point RPH, and an output coupled to second multiplexer MH2.

Second circuit 830 has substantially the same structure as first circuit 820 except that second circuit 830 receives, the height of the kernel Kh, row location Y of reference point RPV of a column kernel, and difference B corresponding to a difference between the height of the data surface Sh and the height of the kernel Kh. The components and the operation of second circuit 830 are otherwise the same as first circuit 820, and therefore, detailed description of second circuit 830 is omitted herein for the sake of brevity.

Matrix multiplier 810 is a circuit that performs matrix multiplication of first series of numbers XA and second series of numbers YA, and generates matrix DA representing valid elements of a data surface covered by a kernel when its reference point is placed at corresponding locations of the data surface. Such matrix multiplier is well known in the art, and therefore, details of matrix multiplier 810 is omitted herein for the sake of brevity.

Denominator circuit 544 is designed for use with the coordinate system where the corner of the valid elements is the origin of the coordinate, as described above with reference to FIGS. 6A and 7A. Using such coordinate system obviates the use of an additional comparator circuit for selecting the width of kernel Kw or first sums V1 as the output of first multiplexer MH1 in first circuit 820 since the sign (positive or negative) of the column location X indicates relative horizontal location RPH relative to vertical boundary L. Similarly, second circuit 830 also omits a comparator circuit for comparing row location Y relative to horizontal boundary T. Additional comparators may be added to circuits 820, 830 or comparator circuits may be used to compare with vertical boundary R or horizontal boundary B when different coordinate systems are used.

Although only first and second circuits 820, 830 are used in embodiment of FIG. 8 to process a data surface of two dimensions, three or more circuits of the same structure may be used to process a data surface of three or higher dimensions.

Example Process for Denominator Numbers

Figure 9:
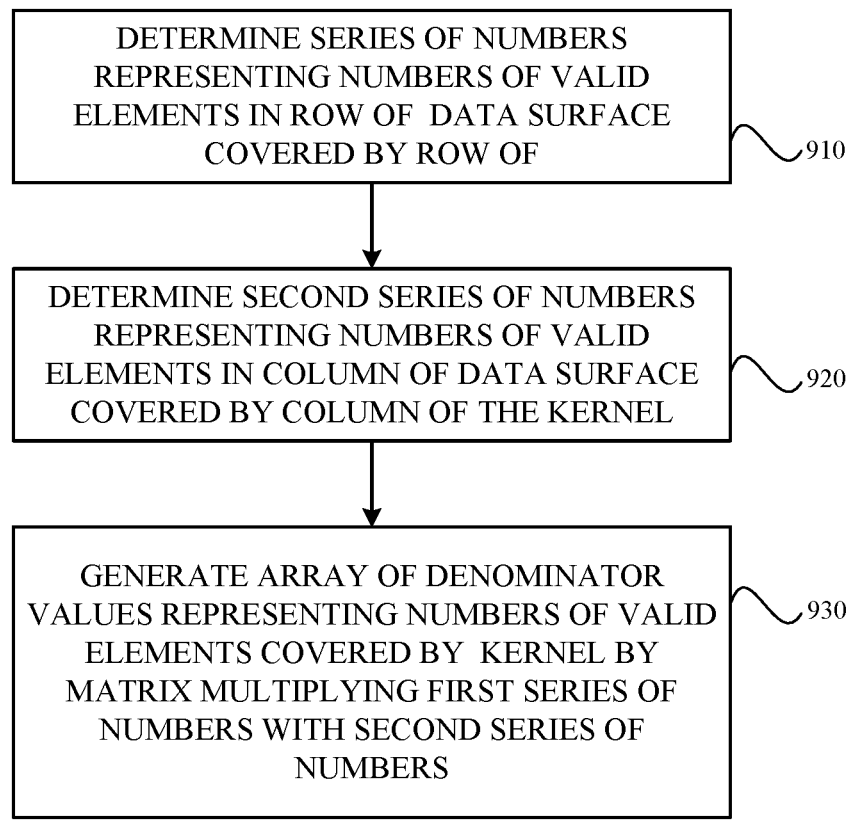
FIG. 9 is a flowchart illustrating a method of determining the numbers of valid elements covered by a kernel, according to one embodiment.

FIG. 9 is a flowchart depicting an example process of determining the number of valid elements covered by a kernel, according to one embodiment. First circuit 820 determines 910 a first series of numbers XA representing the numbers of valid elements in a row of a data surface covered by a row of the kernel when a first reference point of the row of the kernel is placed at different column locations of the row of the surface.

To obtain the first series of numbers XA, first circuit 820 generates first outputs H_LVE each representing the smaller of (i) a width of the kernel Kw and (ii) first sums V1 of the different column locations of the first reference point X and the width of the kernel Kw. First circuit 820 also generates second outputs H_RIVE each representing the smaller of (i) a fixed value of zero and (ii) first differences V2 between the different column locations of the first reference point X and a second difference R between a width of the surface Sw and the width of the kernel Kw. First circuit 820 generates the first series of numbers XA by adding the first outputs H_LVE and the second outputs H_RIVE or subtracting the second outputs H_RIVE from the first outputs H_LVE.

Second circuit 830 determines a second series of numbers YA representing numbers of valid elements in a column of the data surface covered by a column of the kernel when a second reference point of the column of the kernel is placed at different locations of the column of the surface.

To obtain the second series of numbers YA, second circuit 830 generates third outputs V_TVE representing the smaller of (i) a height of the kernel Kh and (ii) second sums V3 of different row locations of the second reference point Y and the height of the kernel Kh. Second circuit 830 also generates fourth outputs V_BIVE representing the smaller of (i) a fixed value of zero and (ii) third differences V4 between the different row locations of the second reference point Y and a fourth difference B between a height of the surface Sh and the height of the kernel K. Second series of numbers YA are generated by adding the third output V_TVE and the fourth output V_BIVE or subtracting the fourth output V_BIVE from the third output V_TVE.

Then, denominator numbers DA representing the numbers of valid elements covered by the kernel is obtained by matrix multiplying the first series of numbers XA with the second series of numbers YA.

The sequence of processes illustrated in FIG. 9 is merely illustrative. For example, determining 920 second series of numbers YA can be performed after or in parallel with determining 910 first series of numbers XA. Further, additional processes not illustrated in FIG. 9 can be added.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A denominator circuit in a neural processor, comprising:
    a first circuit configured to determine a first series of numbers representing numbers of valid elements in a row of a data surface covered by a row of a kernel when a first reference point of the row of the kernel is placed at different column locations of the row of the surface;
    a second circuit configured to determine a second series of numbers representing numbers of valid elements in a column of the data surface covered by a column of the kernel when a second reference point of the column of the kernel is placed at different locations of the column of the surface; and
    a matrix multiplier circuit coupled to the first circuit to receive the first series of numbers and coupled to the second circuit to receive the second series of numbers, the matrix multiplier circuit configured to generate an array of denominator numbers representing numbers of valid elements covered by the kernel by matrix multiplying the first series of numbers with the second series of numbers.

2. The denominator circuit of claim 1, wherein the first circuit comprises:
    a first multiplexer configured to generate first outputs each representing smaller numbers of (i) a width of the kernel and (ii) first sums of the different column locations of the first reference point and the width of the kernel;
    a second multiplexer configured to generate second outputs each representing smaller numbers of (i) a fixed value and (ii) first differences between the different column locations of the first reference point and a second difference between a width of the surface and the width of the kernel; and
    a first adder circuit coupled to the first multiplexer to receive the first outputs and the second multiplexer to receive the second outputs, the first adder circuit configured to generate the first series of numbers by adding the first outputs and the second outputs or subtracting the second outputs from the first outputs.

3. The denominator circuit of claim 2, wherein the first multiplexer comprises:
    a first input configured to receive the width of the kernel,
    a second input configured to receive the first sums, and
    an output configured to output, as the first outputs, (i) the width of the kernel responsive to a column location of the first reference point being a first polarity or (ii) a first sum responsive to the column location of the first reference point being a second polarity opposite to the first polarity.

4. The denominator circuit of claim 2, wherein a column location at an end of a row of the valid elements has a coordinate of 0.

5. The denominator circuit of claim 2, wherein the second multiplexer comprises:
    a first input configured to receive the fixed number,
    a second input configured to receive the first differences, and
    an output configured to output, as the second outputs, the fixed number or a second difference responsive to a polarity of a signal.

6. The denominator circuit of claim 5, wherein the first circuit further comprises a first comparator circuit configured to receive the column location of the first reference point and the second difference, the first comparator circuit configured to generate the signal having the polarity that indicates which of the column location of the first reference point or the second difference is larger.

7. The denominator circuit of claim 5, wherein the first circuit further comprises a second adder circuit comprising:
    a first input configured to receive the width of the kernel,
    a second input configured to receive the different column locations of the first reference point, and
    an output configured to generate the first sums of the width of the kernel and the column location of the first reference point.

8. The denominator circuit of claim 7, wherein the first circuit further comprises a subtract circuit comprising:
    a first input configured to receive the second difference, a second input configured to receive the column location of the first reference point, and an output configured to generate the first difference.

9. The denominator circuit of claim 2, wherein the second circuit comprises:

a third multiplexer configured to generate third outputs representing smaller numbers of (i) a height of the kernel and (ii) second sums of different row locations of the second reference point and the height of the kernel;

a fourth multiplexer configured to generate fourth outputs representing smaller numbers of (i) a fixed value and (ii) third differences between the different row locations of the second reference point and a fourth difference between a height of the surface and the height of the kernel; and a second adder circuit coupled to the third multiplexer to receive the third outputs, and coupled to the fourth multiplexer to receive the fourth outputs, the second adder circuit configured to generate the second series of numbers by adding the third output and the fourth output or subtracting the fourth output from the third output.

10. The denominator circuit of claim 9, wherein the height of the kernel is larger than the height of the surface.

11. The denominator circuit of claim 2, wherein the width of the kernel is larger than the width of the surface.

12. The denominator circuit of claim 1, wherein the first circuit and the second circuit have same circuit components arranged in a same manner.

13. A method for determining a denominator for a pooling operation, comprising:

determining, by a first circuit, a first series of numbers representing numbers of valid elements in a row of a data surface covered by a row of a kernel when a first reference point of the row of the kernel is placed at different column locations of the row of the surface;

determining, by a second circuit, a second series of numbers representing numbers of valid elements in a column of the data surface covered by a column of the kernel when a second reference point of the column of the kernel is placed at different locations of the column of the surface; and generating an array of denominator numbers representing numbers of valid elements covered by the kernel by matrix multiplying the first series of numbers with the second series of numbers.

14. The method of claim 13, wherein determining the first series of numbers comprises:

generating, by a first multiplexer, first outputs each representing smaller numbers of (i) a width of the kernel and (ii) first sums of the different column locations of the first reference point and the width of the kernel;

generating, by a second multiplexer, second outputs each representing smaller numbers of (i) a fixed value and (ii) first differences between the different column locations of the first reference point and a second difference between a width of the surface and the width of the kernel; and generating the first series of numbers by adding the first outputs and the second outputs or subtracting the second outputs from the first outputs.

15. The method of claim 14, wherein a column location at an end of a row of the valid elements has a coordinate of 0.

16. The method of claim 14, wherein generating the second series of numbers comprises:

generating, by a third multiplexer, third outputs representing smaller numbers of (i) a height of the kernel and (ii) second sums of different row locations of the second reference point and the height of the kernel;

generating, by a fourth multiplexer, fourth outputs representing smaller numbers of (i) a fixed value and (ii) third differences between the different row locations of the second reference point and a fourth difference between a height of the surface and the height of the kernel; and generating the second series of numbers by adding the third output and the fourth output or subtracting the fourth output from the third output.

17. The method of claim 16, wherein the height of the kernel is larger than the height of the surface.

18. The method of claim 14, wherein the width of the kernel is larger than the width of the surface.

19. The method of claim 13, wherein the first circuit and the second circuit have same circuit components arranged in a same manner.

20. An electronic device comprising a neural processor circuit, the neural processor circuit comprising:

a first circuit configured to determine a first series of numbers representing numbers of valid elements in a row of a data surface covered by a row of a kernel when a first reference point of the row of the kernel is placed at different column locations of the row of the surface;

a second circuit configured to determine a second series of numbers representing numbers of valid elements in a column of the data surface covered by a column of the kernel when a second reference point of the column of the kernel is placed at different locations of the column of the surface; and a matrix multiplier circuit coupled to the first circuit to receive the first series of numbers and coupled to the second circuit to receive the second series of numbers, the matrix multiplier circuit configured to generate an array of denominator numbers representing numbers of valid elements covered by the kernel by matrix multiplying the first series of numbers with the second series of numbers.

* * * * *